United States Patent
Otani et al.

(10) Patent No.: US 9,539,659 B2
(45) Date of Patent: Jan. 10, 2017

(54) GEAR MACHINING APPARATUS

(71) Applicant: JTEKT CORPORATION, Osaka-shi (JP)

(72) Inventors: Hisashi Otani, Anjyo (JP); Hiroyuki Nakano, Tokai (JP); Hiroaki Goshima, Aisai (JP)

(73) Assignee: JTEKT CORPORATION, Osaka-shi (JP)

(*) Notice: Subject to any disclaimer, the term of this patent is extended or adjusted under 35 U.S.C. 154(b) by 51 days.

(21) Appl. No.: 14/448,165

(22) Filed: Jul. 31, 2014

(65) Prior Publication Data
US 2015/0043985 A1 Feb. 12, 2015

(30) Foreign Application Priority Data
Aug. 8, 2013 (JP) .................................. 2013-164926

(51) Int. Cl.
*B23F 21/00* (2006.01)
*B23F 23/00* (2006.01)
(Continued)

(52) U.S. Cl.
CPC .............. *B23F 21/00* (2013.01); *B23F 5/163* (2013.01); *B23F 5/202* (2013.01); *B23F 21/06* (2013.01);
(Continued)

(58) Field of Classification Search
CPC ............ Y10T 409/104293; Y10T 409/105247; B23F 5/163; B23F 5/16; B23F 5/12; B23F 1/04; B23F 21/04; B23F 21/10; B23F 21/106; B23F 21/28
(Continued)

(56) References Cited

U.S. PATENT DOCUMENTS 2,284,636 A * 6/1942 Carlsen .................. B23F 9/003
409/25
3,099,939 A * 8/1963 Haase ....................... B23F 9/10
409/25
(Continued)

FOREIGN PATENT DOCUMENTS

| EP | 2 639 001 A1 | 9/2013 |
|---|---|---|
| JP | 2005-335061 | 12/2005 |
| JP | 2012-51049 | 3/2012 |
| WO | WO 2014/176169 A2 | 10/2014 |

OTHER PUBLICATIONS

U.S. Appl. No. 14/697,823, filed Apr. 28, 2015, Otani, et al.
Extended European Search Report issued Nov. 24, 2015 in Patent Application No. 14179513.8.

*Primary Examiner* — Daniel Howell
*Assistant Examiner* — Yasir Diab
(74) *Attorney, Agent, or Firm* — Oblon, McClelland, Maier & Neustadt, L.L.P.

(57) ABSTRACT

A gear machining apparatus causes a machining tool and a workpiece to rotate at a high speed in synchronization with each other to machine a highly accurate gear through cutting. The machining tool is manufactured such that each of pitches between tool blades of the machining tool is an integer multiple of a pitch between teeth of the gear, the integer multiple being equal to or larger than double. By using the machining tool for cutting performed by the gear machining apparatus, the number of the tool blades of the machining tool, which are brought into contact with the workpiece at the same time, is reduced. Thus, it is possible to suppress occurrence of self-excited vibrations during cutting by reducing the cutting resistance. Thus, it is possible to enhance the tooth trace accuracy of the gear.

7 Claims, 4 Drawing Sheets

(51) Int. Cl.
*B23F 21/12* (2006.01)
*B23F 5/20* (2006.01)
*B23F 21/06* (2006.01)
*B23F 5/16* (2006.01)
B23F 21/28 (2006.01)
B23F 21/10 (2006.01)
B23F 1/04 (2006.01)

(52) U.S. Cl.
CPC ........... *B23F 21/122* (2013.01); *B23F 23/006* (2013.01); *B23F 1/04* (2013.01); *B23F 21/10* (2013.01); *B23F 21/28* (2013.01); *Y10T 409/108745* (2015.01)

(58) Field of Classification Search
USPC ... 409/28, 26, 25, 27, 30, 34, 35, 36, 37, 51
See application file for complete search history.

(56) References Cited

U.S. PATENT DOCUMENTS

| | | | |
|---|---|---|---|
| 4,955,768 A * | 9/1990 | Crankshaw | B23F 5/00 409/10 |
| 2005/0266774 A1 | 12/2005 | Baldeck | |
| 2010/0111629 A1* | 5/2010 | Durr | B23F 9/10 409/27 |
| 2012/0057944 A1 | 3/2012 | Nagata | |
| 2012/0148360 A1* | 6/2012 | Heinemann | B23F 5/163 409/12 |

\* cited by examiner

GEAR MACHINING APPARATUS

INCORPORATION BY REFERENCE

The disclosure of Japanese Patent Application No. 2013-164926 filed on Aug. 8, 2013 including the specification, drawings and abstract, is incorporated herein by reference in its entirety.

BACKGROUND OF THE INVENTION

1. Field of the Invention

The invention relates to a gear machining apparatus that causes a machining tool and a workpiece to rotate at a high speed in synchronization with each other, thereby machining a gear through cutting.

2. Description of the Related Art

Conventionally, in order to machine a gear through cutting with the use of a machine tool such as a machining center, there has been adopted, for example, a machining method described in Japanese Patent Application Publication No. 2012-51049 (JP 2012-51049 A) as a technique for efficiently machining internal teeth and external teeth. In this machining method, a machining tool such as a skiving tool having a plurality of tool blades, which is rotatable about the tool rotational axis, and a workpiece rotatable about the workpiece rotational axis that is tilted with respect to the tool rotational axis by a prescribed angle are rotated at a high speed in synchronization with each other while the machining tool is fed along the workpiece rotational axis to cut the workpiece. In this way, teeth of a gear are formed.

However, in this machining method, multiple tool blades are brought into contact with the workpiece at the same time, and thus a cutting resistance tends to be high. Thus, self-excited vibrations are likely to occur during cutting, which causes a possibility that the tooth trace accuracy of the gear will be deteriorated (the deviation of the actual tooth trace of the gear from the ideal tooth trace will increase). If the tool diameter of the machining tool is reduced, the number of the tool blades that are brought into contact with the workpiece is also reduced. However, there is a possibility that the stiffness of the machining tool will be reduced.

Therefore, JP 2012-51049 A describes a machining method in which the machining tool is moved in a feed path direction that extends along the surface of each tooth of the workpiece. In the machining method, the machining tool is moved relative to the workpiece in the feed path direction at a variable feed speed. With this machining method, because the intervals between fine machining scratches become irregular along the surface of each tooth, it is possible to reduce noise generated from the site of meshing between the machining tool and the workpiece, that is, self-excited vibrations during cutting.

In the machining method described in JP 2012-51049 A, it is necessary to vary the feed speed of the machining tool relative to the workpiece. As a result, the feed control is complicated. Thus, it is difficult to enhance the degree of accuracy of the tooth profile of the gear.

SUMMARY OF THE INVENTION

One object of the invention is to provide a gear machining apparatus that causes a machining tool and a workpiece to rotate at a high speed in synchronization with each other, thereby machining a gear with a higher degree of accuracy through cutting.

A gear machining apparatus according to an aspect of the invention includes a machining tool having a rotational axis tilted with respect to a rotational axis of a workpiece. The gear machining apparatus feeds the machining tool in a direction of the rotational axis of the workpiece while causing the machining tool and the workpiece to rotate in synchronization with each other to machine a gear. Each of pitches between tool blades of the machining tool is an integer multiple of a pitch between teeth of the gear, the integer multiple being equal to or larger than double.

According to the above aspect, the number of the tool blades of the machining tool, which are brought into contact with the workpiece at the same time, is reduced. Thus, it is possible to suppress occurrence of self-excited vibrations during cutting by reducing the cutting resistance. As a result, it is possible to enhance the tooth trace accuracy of the gear (to reduce the deviation of the actual tooth trace of the gear from the ideal tooth trace).

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

First, the mechanical configuration of a gear machining apparatus 1 according to an embodiment of the invention will be described below. A five-axis machining center, which is an example of the gear machining apparatus 1, will be described with referent to FIG. 1 and FIG. 2. The gear machining apparatus 1 has, as driving axes, three linear axes (an X-axis, a Y-axis and a Z-axis) that are orthogonal to each other, and two rotational axes (an A-axis and a C-axis)

Figure 1:
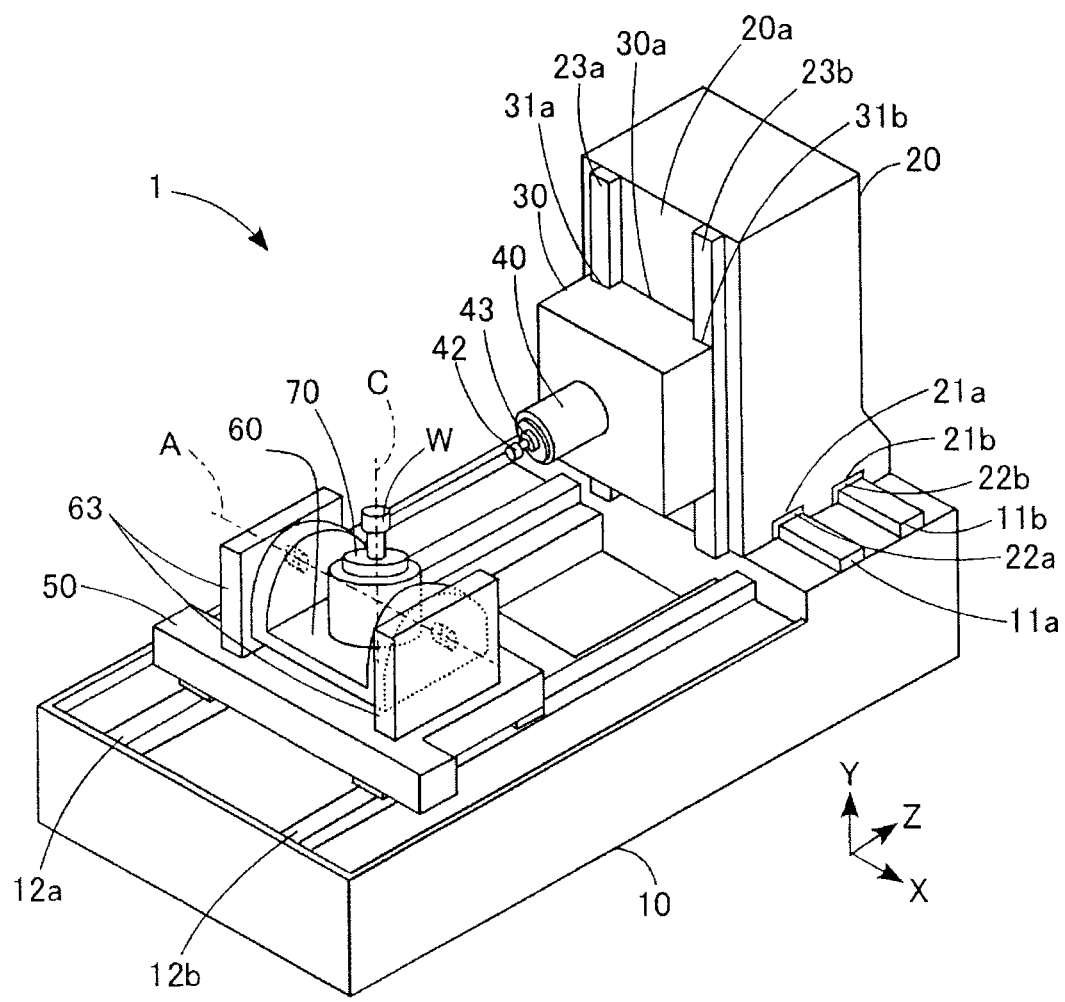
FIG. 1 is a perspective view illustrating the overall configuration of a gear machining apparatus according to an embodiment of the invention.
Figure 2:
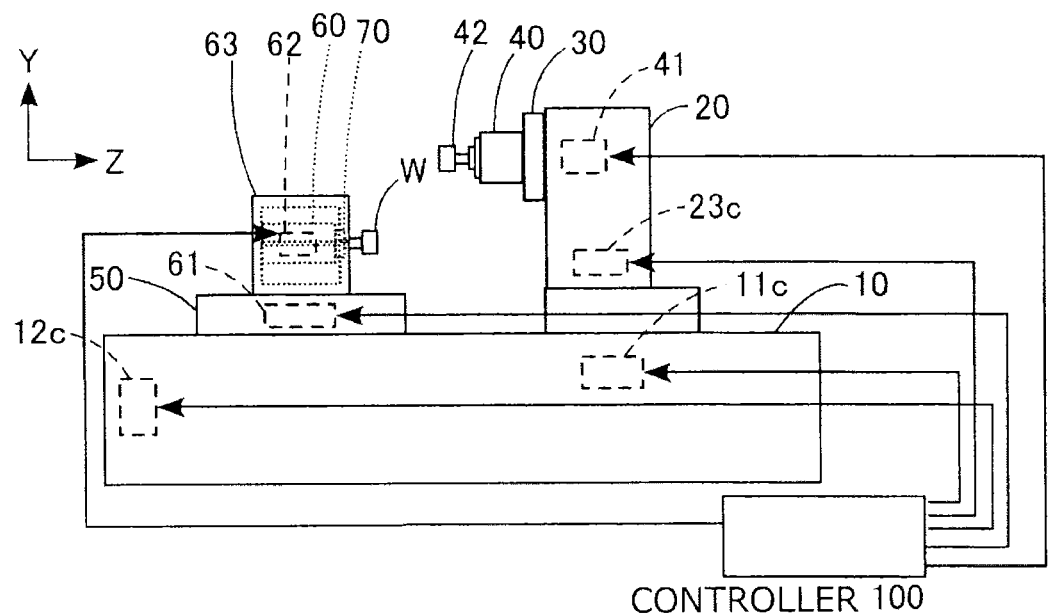
FIG. 2 is a view illustrating the schematic configuration of the gear machining apparatus in FIG. 1 and a controller.

As illustrated in FIG. 1 and FIG. 2, the gear machining apparatus 1 includes a bed 10, a column 20, a saddle 30, a main spindle 40, a table 50, a tilt table 60, a turn table 70, and a controller 100. Although not illustrated, a known automatic tool changer is disposed next to the bed 10.

The bed 10 has a generally rectangular parallelepiped shape, and is disposed on a floor. However, the shape of the bed 10 is not limited to a rectangular parallelepiped shape. A pair of X-axis guide rails 11a, 11b is formed on an upper face of the bed 10 such that the X-axis guide rails 11a, 11b extend in the X-axis direction (horizontal direction) and are arranged parallel to each other. The column 20 is slidable in the X-axis direction, on the X-axis guide rails 11a, 11b. On the bed 10, an X-axis ball screw (not illustrated) for driving the column 20 in the X-axis direction is disposed between the X-axis guide rails 11a, 11b, and an X-axis motor 11c for rotating the X-axis ball screw is disposed.

A pair of X-axis guide grooves 21a, 21b is formed in a bottom face of the column 20 such that the X-axis guide grooves 21a, 21b extend in the X-axis direction and are arranged parallel to each other. The X-axis guide grooves 21a, 21b are fitted on the X-axis guide rails 11a, 11b via ball guides 22a, 22b, so that the column 20 is movable relative to the bed 10 in the X-axis direction. As a result, the bottom face of the column 20 is movably held on the upper face of the bed 10.

A pair of Y-axis guide rails 23a, 23b is formed on a sliding face 20a that is a side face of the column 20, which extends parallel to the X-axis, such that the Y-axis guide rails 23a, 23b extend in the Y-axis direction (vertical direction) and are arranged parallel to each other. The saddle 30 is guided by the Y-axis guide rails 23a, 23b to slide in the Y-axis direction. The column 20 is provided with a Y-axis ball screw (not illustrated) for driving the saddle 30 in the Y-axis direction, which is disposed between the Y-axis guide rails 23a, 23b, and a Y-axis motor 23c for rotating the Y-axis ball screw.

A pair of Y-axis guide grooves 31a, 31b is formed in a side face 30a of the saddle 30, which is opposed to the sliding face 20a of the column 20, such that the Y-axis guide grooves 31a, 31b extend in the Y-axis direction and are arranged parallel to each other. The Y-axis guide grooves 31a, 31b are fitted on the Y-axis guide rails 23a, 23b, so that the saddle 30 is movable in the Y-axis direction relative to the column 20, and the side face 30a of the saddle 30 is in into close contact with the sliding face 20a of the column 20.

The main spindle 40 is disposed so as to be rotated by a spindle motor 41 accommodated in the saddle 30, and supports a machining tool 42. The machining tool 42 is held by a tool holder 43 and thus fixed at the distal end of the main spindle 40, and is thus rotated in accordance with the rotation of the main spindle 40. The machining tool 42 is moved in the X-axis direction and the Y-axis direction relative to the bed 10 in accordance with the movements of the column 20 and the saddle 30. The machining tool 42 is, for example, a hob having a plurality of tool blades in the present embodiment.

Further, a pair of Z-axis guide rails 12a, 12b is formed on the upper face of the bed 10 such that the Z-axis guide rails 12a, 12b extend in the Z-axis direction (horizontal direction), which is orthogonal to the X-axis direction, and are arranged parallel to each other. The table 50 is slidable in the Z-axis direction, on the Z-axis guide rails 12a, 12b. On the bed 10, a Z-axis ball screw (not illustrated) for driving the table 50 in the Z-axis direction is disposed between the Z-axis guide rails 12a, 12b, and a Z-axis motor 12c for rotating the Z-axis ball screw is disposed.

The table 50 is disposed on the Z-axis guide rails 12a, 12b so as to be movable in the Z-axis direction relative to the bed 10. Thus, the table 50 is guided by the Z-axis guide rails 12a, 12b. Tilt table supports 63 that support the tilt table 60 are disposed on an upper surface of the table 50. The tilt table 60 is supported by the tilt table supports 63 so as to be rotatable (tiltable) about the A-axis extending in the horizontal direction. The tilt table 60 is rotated (tilted) by an A-axis motor 61 accommodated in the table 50.

The turn table 70 is disposed on the tilt table 60, and is rotatable about the C-axis that is orthogonal to the A-axis. The workpiece W is fixed to the turn table 70 by a chuck. The turn table 70 is rotated together with the workpiece W by a C-axis motor 62.

The controller 100 controls the spindle motor 41 to rotate the machining tool 42. The controller 100 controls the X-axis motor 11c, the Z-axis motor 12c, the Y-axis motor 23c, the A-axis motor 61 and the C-axis motor 62 to cause the workpiece W and the machining tool 42 to move relative to each other in the X-axis direction, the Z-axis direction and the Y-axis direction and to rotate relative to each other about the A-axis direction and the Y-axis direction, thereby cutting the workpiece W.

Figure 3:
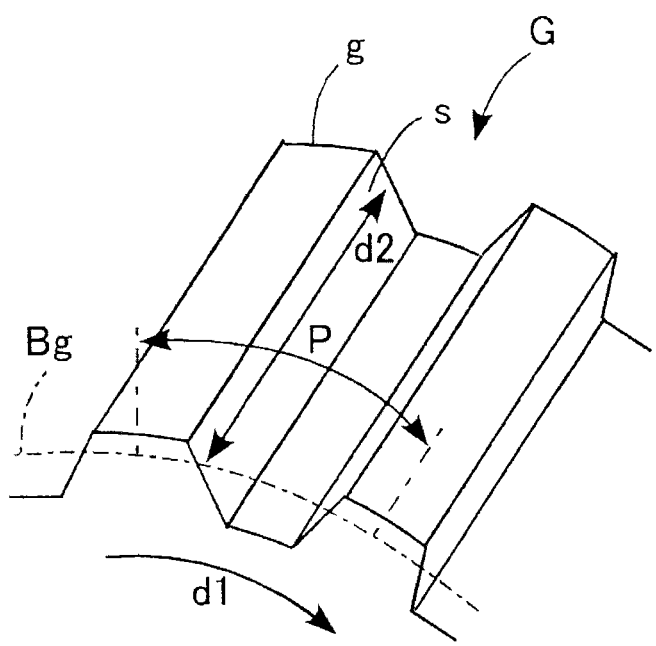
FIG. 3 is a view for explaining a tooth trace deviation that is a deviation of an actual tooth profile of a gear from a theoretical tooth profile.
Figure 4:
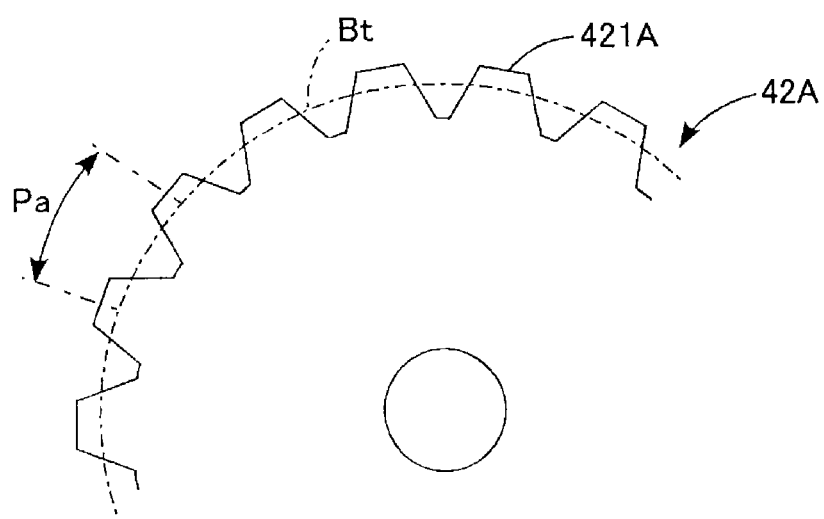
FIG. 4 is a view schematically illustrating a machining tool used commonly.

Next, the tool blades of the machining tool 42 will be described. In the gear machining apparatus 1, the machining tool 42 and the workpiece W are rotated at a high speed in synchronization with each other while the machining tool 42 is fed in the direction of the rotational axis of the workpiece W to cut the workpiece 1, thereby forming teeth. For the teeth cutting, a machining tool 42A (described later in detail) illustrated in FIG. 4 is commonly used. The machining tool 42A may function as a virtual machining tool in the invention. Multiple (for example, five to ten) tool blades 421A of the machining tool 42A are brought into contact with the workpiece W at the same time, thus the cutting resistance tends to be high. And thus, self-excited vibrations are likely to occur during cutting, which causes a possibility that the tooth trace accuracy of a gear will be deteriorated (the deviation of the actual tooth trace of the gear from the ideal tooth trace will increase). The tooth trace accuracy corresponds to a deviation that is acquired by comparing the result of measurement obtained by measuring asperities in a circumferential direction d1, which are formed on a tooth flank s of a tooth g of a gear G, measuring along an axial direction d2, comparing with a theoretical profile of the tooth flank, as illustrated in FIG. 3. The tooth trace accuracy is referred also to as a tooth trace deviation.

Thus, during cutting performed by the gear machining apparatus 1 in the present embodiment, there is adopted a machining tool 42B (refer to FIG. 5: described later in detail) having a shape obtained by thinning out the tool blades 421A of the machining tool 42A that is commonly used. The machining tool 42B may function as a machining tool that is actually used in cutting in the invention. That is, each pitch (interval) Pb between tool blades 421B of the machining tool 42B is an integer multiple of a pitch (interval) P between the teeth g of the gear G to be formed, and the integer multiple is equal to or larger than double. The pitch Pb is a distance between the tool blades 421B that are adjacent to each other on a reference circle (reference line) Bt of the machining tool 42B. The pitch P is a distance between the teeth g that are adjacent to each other on a reference circle (reference line) Bg of the gear G.

Specifically, as illustrated in FIG. 4, the machining tool 42A that is commonly used is manufactured such that a pitch Pa between the tool blades 421A is equal to the pitch P between the teeth g of the gear G to be formed (Pa=P). The pitch Pa between the tool blades 421A of the machining tool 42A is a distance between the tool blades 421A of the machining tool 42A, which are adjacent to each other on the reference circle Bt. The pitch P is a distance between the teeth g that are adjacent to each other on the reference circle Bg of the gear G. The machining tool 42A is manufactured such that the pitches Pa between the tool blades 421A are equal to each other over the entire circumference of the machining tool 42A.

Figure 5:
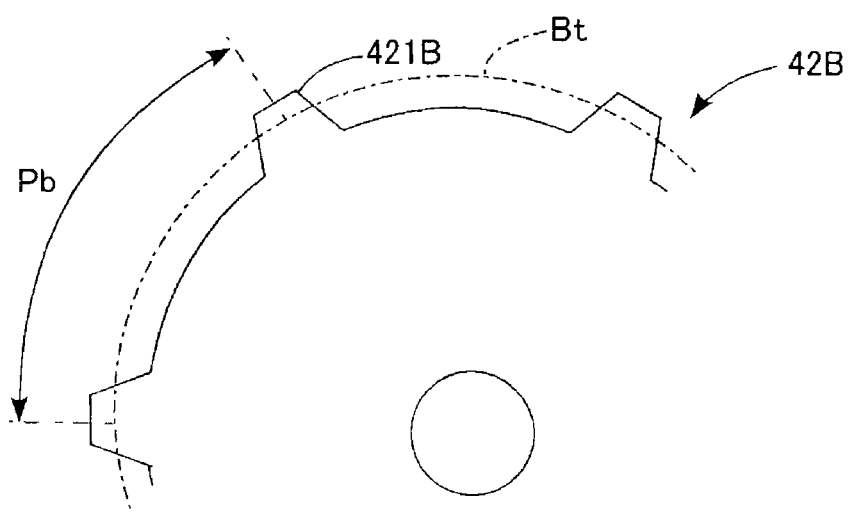
FIG. 5 is a view schematically illustrating a machining tool used in the gear machining apparatus according to the embodiment.

As illustrated in FIG. 5, the machining tool 42B that is used in the gear machining apparatus 1 in the present embodiment is manufactured such that the pitch Pb between the tool blades 421B, that is, the distance between the tool blades 421B that are adjacent to each other on the reference circle bt, is an integer multiple of the pitch P between the teeth g of the gear G and the integer multiple is equal to or larger than double (in the present embodiment, Pb=3P). If the machining tool 42B is used for cutting performed by the gear machining apparatus 1, the number of the tool blades 421B of the machining tool 42B, which are brought into contact with the workpiece W at the same time, is reduced to a small number (for example, one to three). Thus, it is possible to suppress occurrence of self-excited vibrations during cutting by reducing the cutting resistance, thereby enhancing the tooth trace accuracy of the gear G (reducing the deviation of the actual tooth trace of the gear G from the ideal tooth trace).

The machining tool 42B is manufactured such that the pitches Pb between the tool blades 421B are equal to each other over the entire circumference of the machining tool 42B. Thus, it is possible to stabilize loads exerted on the tool blades 421B during cutting.

Next, description will be provided on a method of setting the number of the tool blades 421A formed over the entire circumference of the machining tool 42A that is commonly used. The following description will be provided on the assumption that the number Ng of the teeth g of the gear G, which are formed over the entire circumference of the gear G, has already been set. The number Nt of the tool blades 421A of the machining tool 42A, which are formed over the entire circumference of the machining tool 42A, is set such that the greatest common divisor between the number Nt of the tool blades 421A over the entire circumference of the machining tool 42A and the number Ng of the teeth g of the gear G over the entire circumference of the gear G is an integer that is larger than one. If a certain tool blade 421A is used to form a certain tooth groove by cutting, variations in the accuracy of the tool blades 421A do not exert an influence on the degree of tooth trace accuracy of the gear G (the deviation of the actual tooth trace of the gear G from the ideal tooth trace).

If the greatest common divisor is set to one, the number of rotations of the machining tool 42A, by which the machining tool 42A is rotated from when a certain tool blade 421A is used to form a certain tooth g by cutting until when the certain tool blade 421A is used again to form the certain tooth g by cutting, is a product (Nt×Ng) of the number Nt of the tool blades 421A of the machining tool 42A, which are formed over the entire circumference of the machining tool 42A, and the number Ng of the teeth g of the gear G, which are formed over the entire circumference of the gear G. Thus, the value of the product is extremely large. As a result, it is difficult to enhance the tooth trace accuracy of the gear G (reduce the deviation of the actual tooth trace of the gear G from the ideal tooth trace). However, if the greatest common divisor is set to an integer that is larger than one, it is possible to reduce the deviation of the actual tooth trace of the gear G from the ideal tooth trace.

Further, the number Nt of the tool blades 421A is set such that a quotient that is obtained by dividing the lowest common multiple between the number Nt of the tool blades 421A and the number Ng of the teeth g, by the number Nt of the tool blades 421A, is an integer that is larger than one but equal to or smaller than ten. The quotient exhibits the number of rotations of the machining tool 42A, by which the machining tool 42A is rotated from when a certain tool blade 421A is used to form a certain tooth g by cutting until when the certain tool blade 421A is used again to form the certain tooth g by cutting.

If the quotient is set to one, the number Nt of the tool blades 421A is equal to the number Ng of the teeth g, and thus it is not possible to perform machining of internal teeth of an internal gear. Thus, the quotient is set to an integer that is larger than one in order to allow machining of internal teeth. Further, the quotient is set to an integer that is equal to or smaller than ten in order to enhance the tooth trace accuracy of the gear G (reduce the deviation of the actual tooth trace of the gear G from the ideal tooth trace). In this case, the number of the tool blades 421B of the machining tool 42B is Nt×P/Pb.

Figure 6:
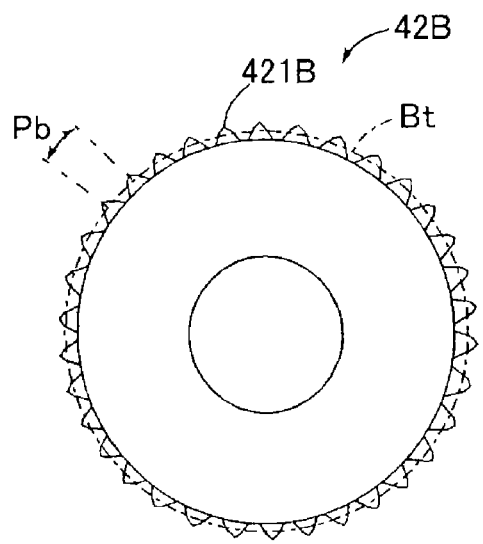
FIG. 6 is a view for explaining a pitch between tool blades of the machining tool in FIG. 5.

Specifically, as illustrated in FIG. 6, if the pitch Pb between the tool blades 421B is set to triple of the pitch P between the teeth g, it is necessary to set the number Ng of the teeth g to a value that is indivisible by three and to set the number Nt of the tool blades 421A to a value that is divisible by three to prevent formation of a tooth g that is not subjected to cutting.

For example, if the number Ng of the teeth g is set to 100 and the number Nt of the tool blades 421A is set to 60, the lowest common multiple between the number Nt of the tool blades 421A, which is 60, and the number Ng of the teeth g, which is 100, becomes 300. The quotient obtained by dividing the common multiple, which is 300, by the number Nt of the tool blades 421A, which is 60, is five that is an integer that is larger than one but equal to or smaller than ten. In this case, the number Nt of the tool blades 421B of the machining tool 42B is 20.

If the number Ng of the teeth g is set to 100 and the number Nt of the tool blades 421A is set to 75, the lowest common multiple between the number Nt of the tool blades 421A, which is 75, and the number Ng of the teeth g, which is 100, is 300. The quotient obtained by dividing the lowest common multiple, which is 300, by the number Nt of the tool blades 421A, which is 75, is four that is an integer that is larger than one but equal to or smaller than ten. In this case, the number of the tool blades 421B of the machining tool 42B is 25.

If the number Ng of the teeth g is set to 100 and the number Nt of the tool blades 421A is set to 150, the lowest common multiple between the number Nt of the tool blades 421A, which is 150, and the number Ng of the teeth g, which is 100, is 300. The quotient obtained by dividing the lowest common multiple, which is 300, by the number Nt of the tool blades 421A, which is 150, is two that is an integer that is larger than one but equal to or smaller than ten. In this case, the number Nt of the tool blades 421B of the machining tool 42B is 50 and thus the diameter of the machining tool 42B is larger than the diameter of the gear G As a result, the machining tool 42B in this case is exclusively used for machining of the external teeth of the gear G.

On the other hand, if the number Ng of the teeth g is set to 100 and the number Nt of the tool blades 421A is set to 45, the lowest common multiple between the number Nt of the tool blades 421A, which is 45, and the number Ng of the teeth g, which is 100, is 900. The quotient obtained by dividing the lowest common multiple, which is 900, by the number Nt of the tool blades 421A, which is 45, is 20 that is an integer that is larger than ten. Thus, if the number Nt of the tool blades 421A is 45, it is possible to enhance the tooth trace accuracy of the gear G (reduce the deviation of the actual tooth trace of the gear G from the ideal tooth trace) but only slightly.

For the reasons stated above, the number Nt of the tool blades 421A is set to 60, 75 or 150. If the number of the tool blades 421A is 60, each time the machining tool 42B is rotated five times, a certain tool blade 421*b* used to form a certain teeth g by cutting is used again to form the certain teeth g by cutting. If the number of the tool blades 421A is 75, each time the machining tool 42B is rotated four times, a certain tool blade 421*b* used to form a certain teeth g by cutting is used again to form the certain teeth g by cutting. If the number of the tool blades 421A is 150, each time the machining tool 42B is rotated twice, a certain tool blade 421*b* used to form a certain teeth g by cutting is used again to form the certain teeth g by cutting.

Based on the results described above, the following expression (1) is established.

$$Nt = Ng \times s/t \tag{1}$$

where Nt: the number of the tool blades 421A

Ng: the number of the teeth g s: the pitch Pb between the tool blades 421B/the pitch P between the teeth g t: divisor of the teeth g Further, in order to ensure a sufficient degree of stiffness of the machining tool 42B, a value L/d obtained by dividing a tool length L, which is the distance from the distal end face of the main spindle 40 to the distal end face of the machining tool 42B, by a tool diameter d, is set to approximately one. The tool diameter d is obtained based on the relationship between a module of the gear G and the number of the tool blades 421B. By substituting given numbers into the expression (1), the number Nt of the tool blades 421A is obtained, and the number No×P/Pb of the tool blades 421B is obtained in order to complete manufacturing of the machining tool 42B.

Figure 7:
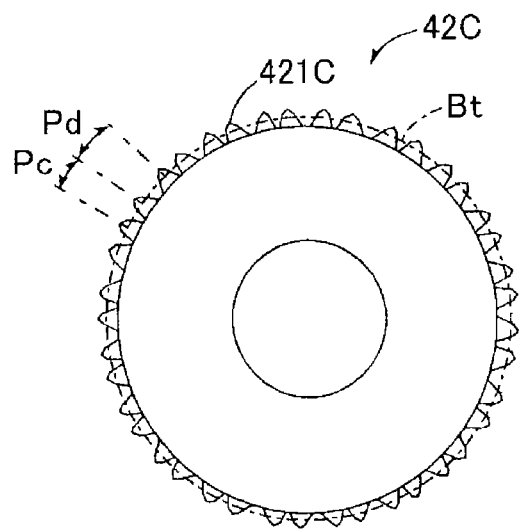
FIG. 7 is a view illustrating a machining tool used in a gear machining apparatus according to another embodiment of the invention.

Next, tool blades of the machining tool according to another embodiment of the invention will be described. In the above-described embodiment, the machining tool 42B is manufactured such that the pitches Pb between the tool blades 421B are equal to each other over the entire circumference of the machining tool 42B. However, in the other embodiment, a machining tool 42C may be manufactured, as illustrated in FIG. 7, such that a pitch Pc and a pitch Pd between tool blades 421C are not equal to each other and are arranged over the entire circumference of the machining tool 42C.

For example, the machining tool 42C may be manufactured such that the pitch Pc is set twice as large as the pitch P between the teeth g of the gear G(Pc=2P) and the pitch Pd is set three times as large as the pitch P between the teeth g of the gear G (Pc=3P), and a pattern in which the pitch Pc and the pitch Pd are arranged next to each other is repeated over the entire circumference of the machining tool 42C. With this configuration, the cutting resistance varies irregularly instead of varying regularly, and thus self-excited vibrations are less likely to occur during cutting. As a result, it is possible to enhance the tooth trace accuracy of the gear G (reduce the deviation of the actual tooth trace of the gear G from the ideal tooth trace). Note that the combination of the pitches between the tool blades 421C of the machining tool 42C, which are not equal to each other, is not limited to the combination of the pitch Pc, which is twice as large as the pitch P between the teeth g of the gear G, and the pitch Pd, which is three times as large as the pitch P. The combination of the pitches between the tool blades 421C of the machining tool 42C, which are not equal to each other, may be a combination of any multiples of the pitch P between the teeth g of the gear G.

In the above-described embodiment, the gear machining apparatus 1 that is a five-axis machining center rotates the workpiece W about the A-axis. Alternatively, a five-axis vertical machining center may be used to rotate the machining tool 42 about the A-axis. In the above-described embodiment, the invention is applied to the machining center. Alternatively, the invention may be applied also to a machine tool exclusively used for machining a gear. In the above-described embodiment, the external gear is machined. Alternatively, the invention may be applied also to machining of an internal gear.

What is claimed is:

1. A gear machining method comprising the steps of:

providing a virtual machining tool;

thinning out the tool blades of the virtual machining tool to thereby provide a machining tool;

positioning the machining tool to have a rotational axis tilted with respect to a rotational axis of a workpiece; and feeding the machining tool in a direction of the rotational axis of the workpiece while causing the machining tool and the workpiece to rotate in synchronization with each other to machine a gear, wherein each of pitches between tool blades of the machining tool is an integer multiple of a pitch between teeth of the gear, the integer multiple being equal to or larger than two, and wherein a greatest common divisor between the number of tool blades of the virtual machining tool having the same pitch as the pitch between the teeth of the gear and the number of the teeth of the gear is an integer larger than one.

2. The gear machining method according to claim 1, wherein the tool blades of the virtual machining tool are thinned out such that pitches between the tool blades are equal to each other.

3. The gear machining method according to claim 1, wherein:

a quotient obtained by dividing a lowest common multiple of the number of tool blades of a virtual machining tool having the same pitch as the pitch between the teeth of the gear and the number of the teeth of the gear by the number of the tool blades of the virtual machining tool is an integer larger than one.

4. The gear machining method according to claim 3, wherein the quotient is an integer that is equal to or smaller than ten.

5. The gear machining method according to claim 1, wherein the pitches between the tool blades of the machining tool are not equal to each other.

6. The gear machining method according to claim 5, wherein the pitches between the tool blades of the machining tool comprise repeated patterns of pitches, which repeated patterns are repeated over the entire circumference of the machining tool, and wherein each of the repeated patterns comprises a first pitch and a second pitch which is different from the first pitch and which is provided next to the first pitch.

7. The gear machining method according to claim 6, wherein the first pitch is twice as large as the pitch between the teeth of the gear, and wherein the second pitch is three times as large as the pitch between the teeth of the gear.

* * * * *